US012412229B2

(12) United States Patent
Aronshtam et al.

(10) Patent No.: US 12,412,229 B2
(45) Date of Patent: Sep. 9, 2025

(54) ANTI-COLLUSION SYSTEM USING MULTIPLE WATERMARK IMAGES

(71) Applicant: Synamedia Limited, Staines Upon Thames (GB)

(72) Inventors: Yair Aronshtam, Efrat (IL); Lev Reitblat, Maale Adumim (IL); Anatoly Seldin, Jerusalem (IL); Max Sorkin, Mevaseret (IL)

(73) Assignee: SYNAMEDIA LIMITED, Maidenhead (GB)

( * ) Notice: Subject to any disclaimer, the term of this patent is extended or adjusted under 35 U.S.C. 154(b) by 496 days.

(21) Appl. No.: 17/746,081

(22) Filed: May 17, 2022

(65) Prior Publication Data

US 2023/0377085 A1    Nov. 23, 2023

(51) Int. Cl.
  *G06T 1/00*    (2006.01)
  *H04N 21/8358*    (2011.01)
(52) U.S. Cl.
  CPC ....... *G06T 1/0071* (2013.01); *H04N 21/8358* (2013.01)

(58) Field of Classification Search
  None
  See application file for complete search history.

(56) References Cited

U.S. PATENT DOCUMENTS

| 11,540,029 | B2 * | 12/2022 | Kilstein | ........... H04N 21/23418 |
| 2015/0237323 | A1 * | 8/2015 | Du | ........................ G06T 1/0028 348/43 |
| 2021/0352381 | A1 * | 11/2021 | Kilstein | ........... H04N 21/23418 |
| 2023/0377085 | A1 * | 11/2023 | Aronshtam | ........... G06T 1/0071 |

* cited by examiner

*Primary Examiner* — Tahmina N Ansari
(74) *Attorney, Agent, or Firm* — Fernando & Partners, LLP (57) ABSTRACT

Anti-collusion techniques that use multiple watermark images are described herein. In accordance with various embodiments, a client device includes a processor and a non-transitory memory. The client device obtains a watermark image representing a watermark identifier. The client device further generates multiple variants of the watermark image representing the watermark identifier, where the multiple variants differ in parameters. The client device also selects a first variant from the multiple variants to bind with a media content item at a first time. The client device additionally binds the first variant with the media content item for rendering.

20 Claims, 8 Drawing Sheets

Load the multiple variants to multiple graphic layers, where each of the multiple graphic layers includes one of the multiple variants, where binding the first variant with the media content item for rendering includes activating a first graphic layer of the multiple graphic layers including the first variant at the first time for rendering with the media content item ~550

Selecting the first variant from the multiple variants to bind with the media content item at the first time includes: (a) selecting a first graphic layer from the multiple graphic layers at the first time; and (b) determining an opacity value for the first graphic layer to render with the media content item ~552

ANTI-COLLUSION SYSTEM USING MULTIPLE WATERMARK IMAGES

TECHNICAL FIELD

The present disclosure relates generally to security in multimedia content delivery and, more specifically, to anti-collusion using multiple watermark images.

BACKGROUND

Collusion attacks are common on watermarked videos for eluding watermark identifier (WMID) detection. An attacker conducting collusion attacks typically captures watermark-embedded media content from multiple colluding sources (e.g., multiple client devices) and mixes them into a single output to corrupt the watermarks. There are several types of collusion attacks, e.g., averaging, time slicing, or tiling. During the averaging type of collusion attacks, the colluders average color and brightness values of source videos. As such, the watermarks embedded in the videos delivered to the colluding sources are not identifiable in the colluded copy. During the time slicing type of collusion attacks, the colluders allocate some time slices for each colluding source, e.g., 2 seconds, and combine the video slices to confuse watermark detection. During the tiling type of collusion attacks, each colluder contributes a different part of the colluded video, e.g., a half or a quarter of a picture. The tiled image in the colluded video may confuse watermark detection. In any type of collusion attack, the attacker takes advantage of multiple client devices implementing the same watermarking policy based on a single image. By corrupting the single image, collusion attacks prevent the WMID detection in the single image.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

An anti-collusion system described herein uses multiple watermark identifier (WMID) images (also referred to as the watermark images) for blending with videos. Because more than one watermark image is used for WMID presentation, the watermark images applied by client devices differ in various aspects. In some embodiments, the client watermark embedder uses different watermark image generation parameters and randomly chooses which one to apply. When an attacker uses a mix of source videos for collusion attacks, because different source videos have different methods and/or parameters for watermark image generation, at least some of the watermark images are not corrupted and are identifiable. In other words, using different image generation methods for different clients not only mitigates collusion attacks but also improves the detectability of WMIDs after the collusion attacks. As such, the anti-collusion system described herein overcomes collusion attacks and enables the detection of WMIDs of colluding sources.

In accordance with various embodiments, an anti-collusion method is performed at a device including a processor and a non-transitory memory. The method includes obtaining a watermark image representing a watermark identifier. The method further includes generating multiple variants of the watermark image representing the watermark identifier, where the multiple variants differ in parameters. The method also includes selecting a first variant from the multiple variants to bind with a media content item at a first time. The method additionally includes binding the first variant with the media content item for rendering.

Example Embodiments

As explained above, many previously existing watermarking systems blend the same watermark image into a video following a single policy regarding the timing, duration, and opacity. To address the aforementioned issues in many previously existing watermarking system, the methods, devices, and systems described herein use more than one watermark image for watermarking. Further, the watermark images differ by various parameters, and each watermark image is blended into the video following different policies. The differences between the watermark images and/or the policies mitigate collusion attacks. Once the watermark images according to various embodiments described herein are embedded, the resulting colluding video allows identifying the WMIDs of the colluding sources and eliminates false positives. As such, relative to previously existing systems that suffer from distorted watermark identifiers (WMIDs) in the colluding video, the system described herein improves watermark detectability and resists collusion attacks.

Figure 1:
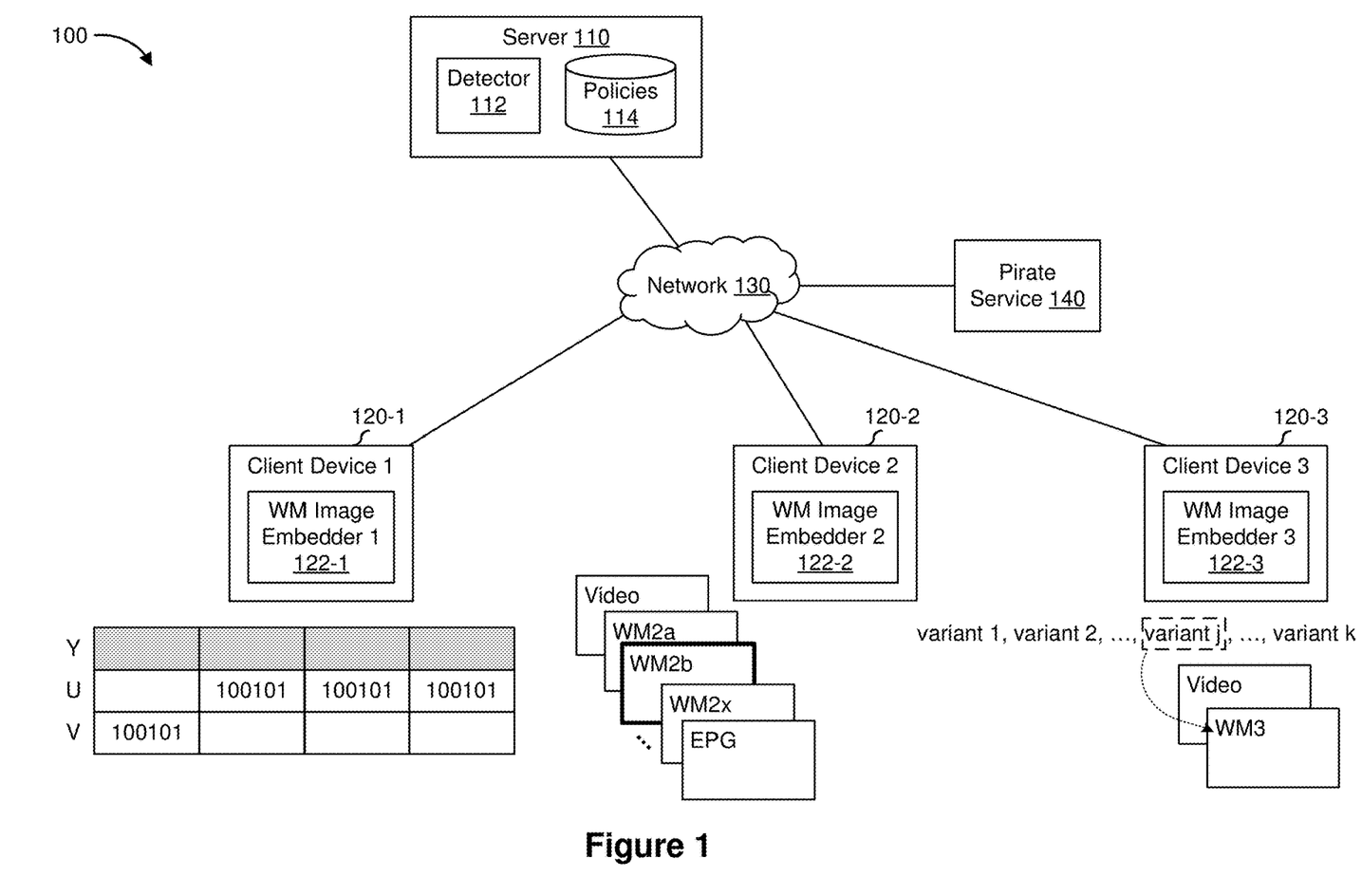
FIG. 1 is a block diagram of an exemplary multimedia content delivery system that uses multiple watermark images for anti-collusion, in accordance with some embodiments.

FIG. 1 is a diagram illustrating an exemplary multimedia content delivery system 100 that uses multiple watermark images for anti-collusion in accordance with some embodiments. In the exemplary multimedia content delivery system 100, a server 110, via a network 130, prepares and distributes multimedia content (e.g., videos, audio, text, etc.) to a plurality of client devices, e.g., client device 1 120-1, client device 2 120-2, and client device 3 120-2, etc., collectively referred to hereinafter as the client devices 120 In some embodiments, the server 110 includes one or more processing units (CPUs) (e.g., processor(s)), a non-transitory memory, a programming interface, one or more communication buses for interconnecting these and various other components, and/or one or more input/output interfaces (e.g., input devices, sensors, a network interface, and/or a display, etc.). The client device 120 can be a TV, a set top box (STB), a mobile device, and/or a tablet, etc. for rendering watermark-embedded media content. In some embodiments, each of the client devices 120 includes a respective watermark image embedder, e.g., watermark image embedder 1 122-1 on client device 1 120-1, watermark image embedder 2 122-2 on client device 2 120-2, and watermark image embedder 3 122-2 on client device 3 120-3, etc., collectively referred to hereinafter as the watermark image embedder 122.

In some embodiments, more than one watermark image is used by the watermark image embedder 122 for watermark identifier (ID) presentation. As used herein, a watermark ID (WMID) can be a client ID (e.g., a client device ID, a user ID, an account ID, etc.) and/or a session ID that identifies the consumption of a media content item and/or the source of the distribution of the watermark-embedded media content item. As such, the terms "WMID" and "client ID" are used interchangeably.

In some embodiments, the watermark images used by the watermark image embedder 122 differ from each other and are applied by the client devices 120 according to various policies stored in a policies datastore 114. As will be described in further detail below, randomizing watermark image selection in time across the plurality of client devices 120 ensures that there are times when different client devices 120, as colluding sources contributing to a pirate source 140, use different methods and/or parameters according to different policies. As such, the exemplary system 100 improves the detectability of watermark IDs by a detector 112 on the server 110 even after the pirate service 140 initiates collusion attacks.

For example, for client device 1 120-1, the policies datastore 114 records that watermark image embedder 1 122-1 uses more than one color channel for the watermark image corresponding to the watermark ID 100101, e.g., using channel U or V and randomly choosing which one to apply. Video encoding often includes a Y channel, a U channel, and a V channel. Y is a luminance signal, indicating a brightness, e.g., a grayscale value, and U and V are two color difference signals describing an image color and a saturation used to designate a color of a pixel. It should be noted that although the example shown herein uses channels U and V for embedding the watermark image, other channels in multi-channel color representations can be used in place of or in conjunction with channels U and V. An example of using more than one color channel for the watermark image embedding is further illustrated and described with reference to FIGS. 2A and 2B.

In another example, for client device 2 120-2, the policies datastore 114 records that watermark image embedder 2 122-2 creates watermark images according to different parameters specified in a list and embeds the watermark images in multiple layers, e.g., layers WM2a, WM2b, ..., WM2x, etc. Further, watermark image embedder 2 122-2 chooses which layer to apply and bind with a video layer and an electronic program guide (EPG) layer according to policies. The parameters, for example, can include opacity values, time intervals, angles, sizes, locations, and/or languages, etc.

As used herein, a layer can be a physical layer or a virtual layer, and the watermark image embedder 122 can use various methods for rendering the multiple layers, e.g., using hardware overlay to write the watermark image layer(s) to a dedicated video processing hardware or providing the layering information to shared memory, etc. Further, as will be described in further detail below, the watermark images can vary in size, shape, and/or location etc., e.g., covering a bottom left corner of the underlying video. As such, the watermark images for anti-collusion can include a variety of pixels, images, and can be rendered using any multi-layer rendering technique.

In yet another example, for client device 3 120-3, the policies datastore 114 records that watermark image embedder 3 122-3 randomly chooses a set of parameters from different watermark image generation parameters (e.g., as specified in a list according to a policy) and binds the chosen watermark image (e.g., WM3) with a video. In the example shown in FIG. 1, multiple variants of a watermark image (e.g., variant 1, variant 2, ..., variant j, ..., variant k, etc.) can be generated by watermark image embedder 3 122-3 according to various parameters, and watermark image embedder 3 122-3 selects one variant (e.g., variant j) to embed with the video layer.

As shown in FIG. 1, in the exemplary system 100, more than one watermark image is used by the watermark image embedder 122 for WMID presentation. The watermark images differ from each other and are applied by the client devices 120 according to various policies. As will be described in further detail below, randomizing watermark image selection in time across the plurality of client devices 120 ensures that there are times when different client devices 120 contributing to a pirate source 140 use different methods and/or parameters and according to different policies, thus improving the detectability of WMIDs by a detector 112 on the server 110 even after the pirate service 140 initiates collusion attacks.

Figure 2A:
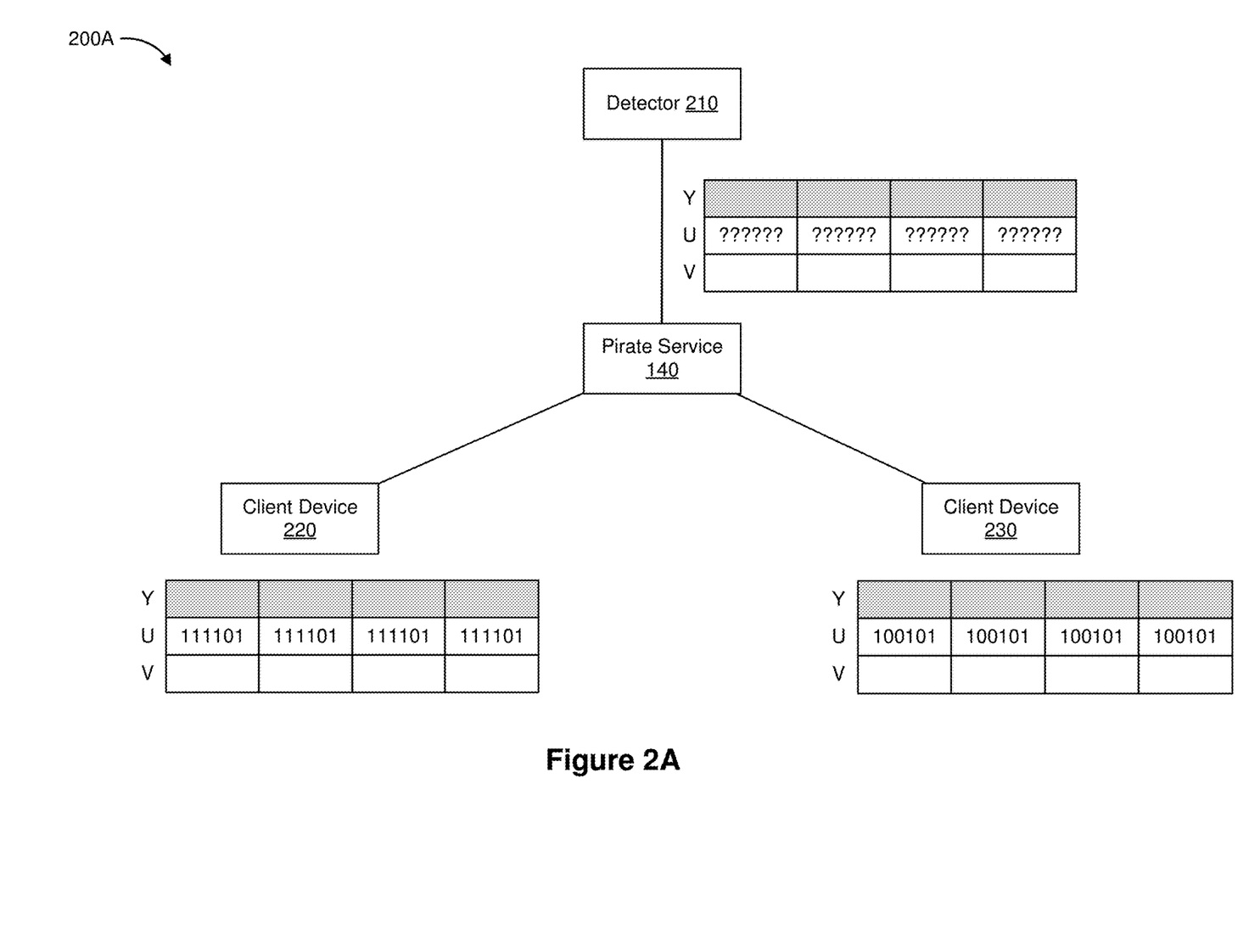
FIG. 2A is a diagram illustrating colluding watermarks in a system using a single watermark image.

FIG. 2A is a diagram 200A illustrating colluding watermarks in a system using a single watermark image. In FIG. 2A, a client device 220 is associated with one client identifier, e.g., 111101, and a client device 230 is associated with a different client identifier, e.g., 100101. Both of the client device 220 and the client device 230 apply the same watermark embedding policy, e.g., embedding a single watermark image with the client identifier in channel U. The pirate service 140 coordinates a collusion attack by obtaining the watermark-embedded images from the client device 220 and the client device 230, and mixing them into a single output using collusion attack methods such as averaging, time slicing, tiling, etc. As a result, a detector 210 cannot detect the identifiers in the single output distributed by the pirate service 140 and cannot identify the client device 220 and the client device 230 being the colluding sources for the pirate service 140.

Figure 2B:
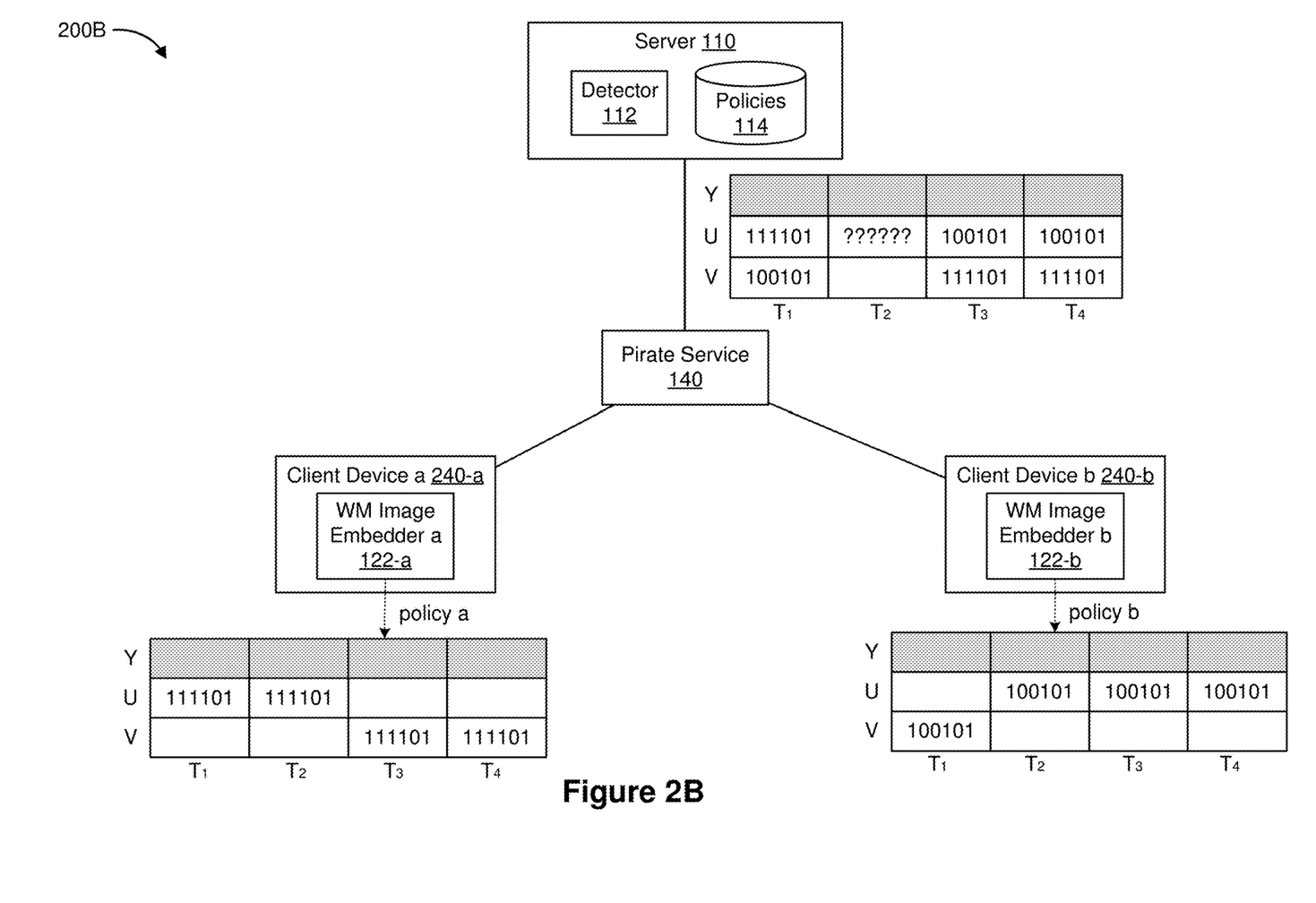
FIG. 2B is a diagram illustrating detecting watermarks in the exemplary multimedia content delivery system that uses multiple watermark images for watermarking, in accordance with some embodiments.

In contrast, FIG. 2B is a diagram 200B illustrating applying different watermarking policies for watermark image embedding to allow the detection of colluding sources in accordance with some embodiments. In FIG. 2B, client device a 240-*a* includes watermark image embedder a 122-*a*, and client device b 240-*b* includes watermark image embedder b 122-*b*. In some embodiments, watermark image embedder a 122-*a* generates one watermark image representing the client ID, e.g., 111101, using color channel U and generates another watermark image representing the same client ID using color channel V. Further, watermark image embedder a 122-*a* selects one of the watermark images to blend into the video at a given time according to policy a, e.g., randomly or according to certain patterns to blend the channel U watermark image at time $T_1$ and time $T_2$ and blend the channel V watermark image at time $T_3$ and time $T_4$. Likewise, watermark image embedder b 122-*b* generates one watermark image representing the client ID, e.g., 100101, using color channel U and generates another watermark image representing the same client ID using color channel V, and selects one of the watermark images to blend into the video at a given time according to policy b to blend the channel U watermark image at time $T_2$, time $T_3$, and time $T_2$ and blend the channel V watermark image at time $T_1$. In some embodiments, both policy a and policy b are stored in the policies datastore 114, so that the detector 112 can scan different color channels for not only collusion detection but also the detection of client IDs in video(s) contributed by colluding sources.

When a collusion attack is performed using video sources from the client devices 240-*a* and 240-*b*, it is highly likely that given the length of the clip recorded for identification is sufficient, there are sufficient number of occurrences in the clip, where the watermark images from different colluding sources appear in different color channels. The differences allow the detector 112 to scan both color channels separately to find the identifiers of the colluding sources. In particular, in some embodiments, the policies data store 114 records policies a and b, e.g., the timing of rendering the watermark image and/or the color channel to use. At some times, when both colluders use the same color at the same time (e.g., at time $T_2$), the identifier in the resulting video is not detectable. However, at other times, e.g., time $T_1$, time $T_3$, and time $T_4$, even if both colluder client devices 240-*a* and 240-*b* render the watermark images simultaneously, both client identifiers 111101 and 100101 are detectable because the color channels are different.

Figure 3:
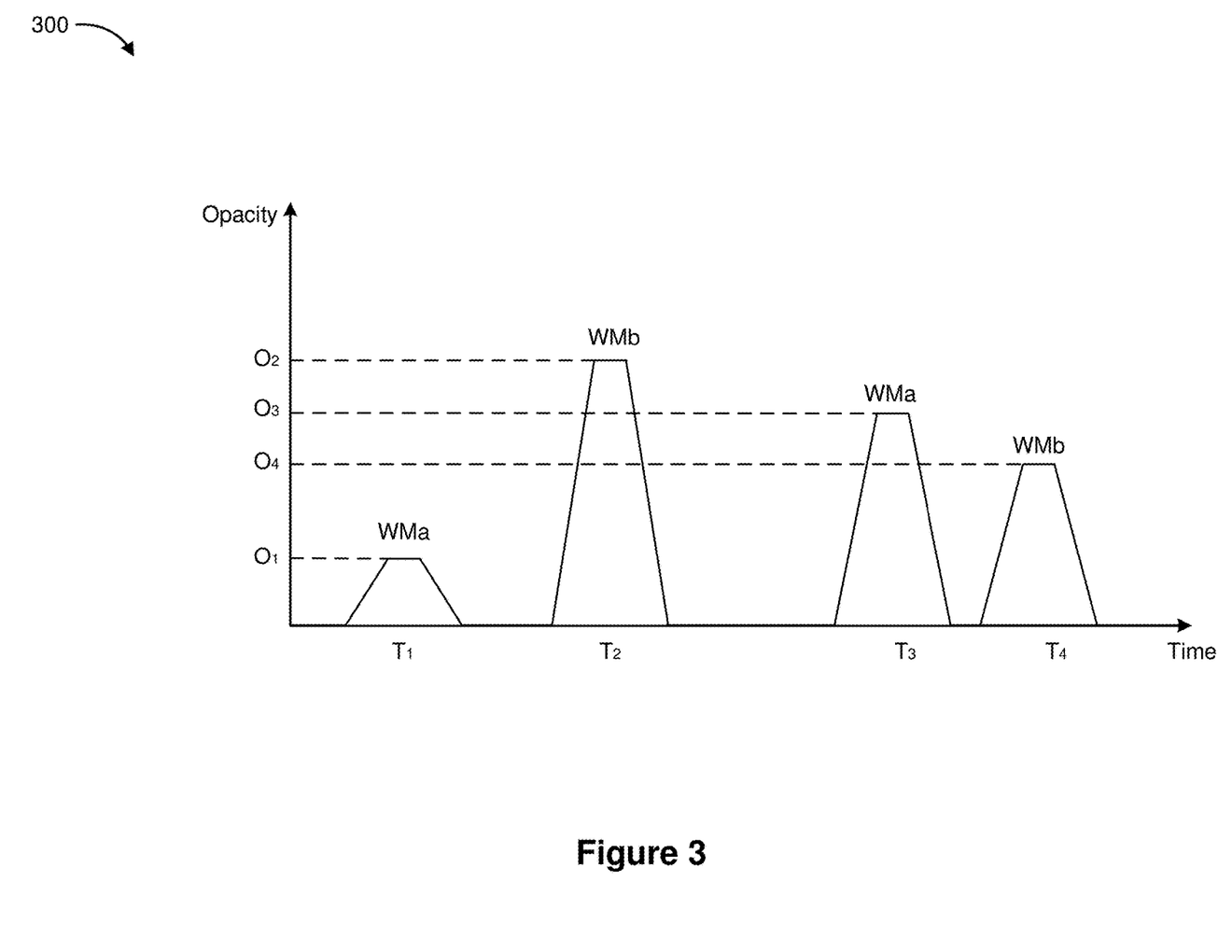
FIG. 3 is a diagram illustrating selecting a watermark image embedded layer with varying opacity values for anti-collusion, in accordance with some embodiments.

FIG. 3 is a diagram 300 illustrating selecting watermark image embedded layer with varying opacity values for anti-collusion in accordance with some embodiments. In some embodiments, as described above with reference to FIG. 1, according to various policies, the watermark image embedder creates more than one watermark image. In some embodiments, the watermark image embedder further loads each image to a separate graphic layer, a pane, and/or a surface, e.g., a physical or a virtual layer. Further, in some embodiments, the watermark image embedder activates one watermark image embedded layer at a time. The watermark image embedder thus implements the policy to determine which layer to show and the corresponding opacity value and/or transparency level for the layer.

For example, according to a policy, the watermark image embedder loads watermark image a into one layer (WMa) and loads watermark image b into another layer (WMb). Further, according to the policy, as shown in FIG. 3, the watermark image embedder activates WMa around time $T_1$ and sets the opacity value at $O_1$. Around time $T_2$, according to the policy, the watermark image embedder activates WMb and sets the opacity value at $O_2$, lower than the opacity value $O_1$ set at time $T_1$. Likewise, also according to the policy, the watermark image embedder switches to WMa around time $T_3$ with the opacity value $O_3$ and switches to WMb around time $T_4$ with the opacity value $O_4$.

As shown in FIG. 2, the intervals between $T_1$, $T_2$, $T_3$, and $T_4$ vary. The opacity values $O_1$, $O_2$, $O_3$, and $O_4$ also vary. Further, the selections of the layer to show vary. As such, different watermark image embedded layers are shown on different client devices according to different parameters specified by different policies. The detector on the server would be able to scan and detect layers with different opacity values to detect the identifiers of the colluding source.

Figure 4A:
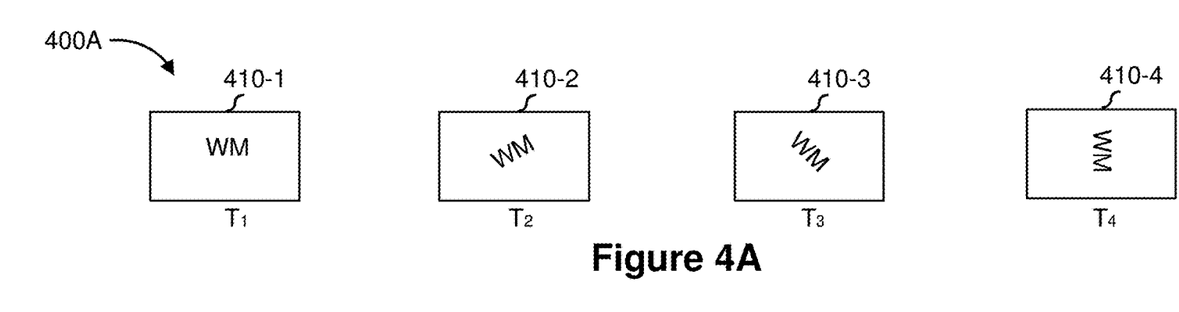
FIGS. 4A-4C are diagrams illustrating generating variants of a watermark image for anti-collusion, in accordance with some embodiments.
Figure 4B:
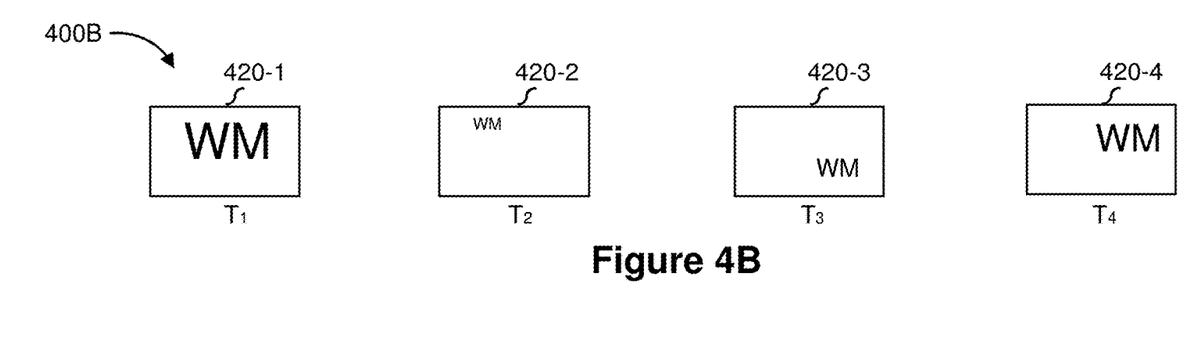
Figure 4C:
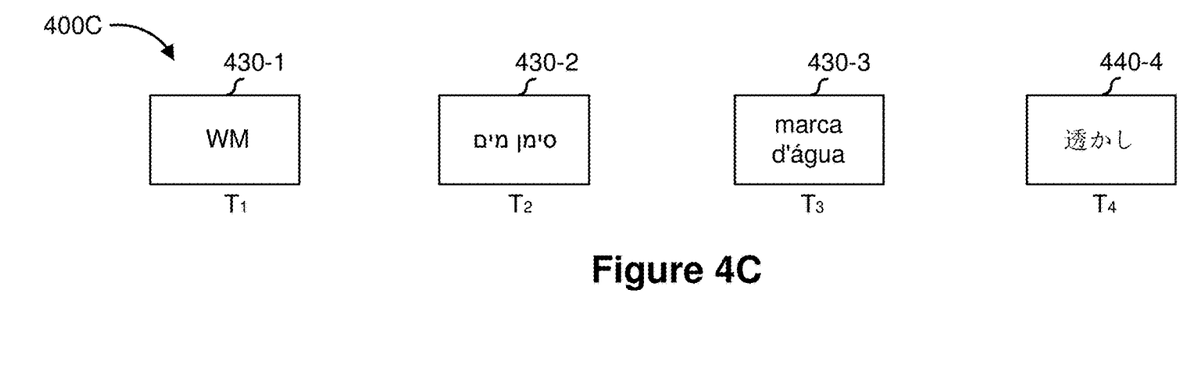

FIGS. 4A-4C are diagrams 400A-400C illustrating generating variants of a watermark image to be used by the exemplary system 100 (FIG. 1) for anti-collusion in accordance with some embodiments. In some embodiments, the watermark image embedder (e.g., the watermark image embedder 122, FIG. 1) generates a watermark image and makes copies of the watermark image. In each copy, the system rotates the watermark to a certain angle from a predefined list in accordance with some embodiments. In some embodiments, the watermark image embedder performs the rotations according to a policy, e.g., a policy specifying the degree and/or angle of rotations for different copies. Further, according to the policy, the watermark image embedder selects one of the copies to blend into the video at a given time, e.g., the policy specifying a random selection or according to certain patterns.

In FIG. 4A, the watermark image embedder rotates a watermark image to four different angles in four copies, e.g., a first copy 410-1, a second copy 410-2, a third copy 410-3, and a third copy 410-4 each with the watermark image rotating to a different angle as a variant. Further as shown in FIG. 4A, the watermark image embedder selects the first copy 410-1 at time $T_1$, selects the second copy 410-2 at time $T_2$, selects the third copy 410-3 at time $T_3$, and selects the fourth copy 410-4 at time $T_4$ to blend into the video according to the policy. As such, even if watermark images from two client devices are colluded, because the embedded watermark images from the client devices have different rotation angles, the detector (e.g., the detector 112, FIG. 1) can discover both client identifiers by scanning each defined angle according to the policy information in the policies datastore. When the length of the clip recorded for identification is sufficient, the detector can locate occurrences in the clip, where the watermark images from different colluding sources appear with different rotation angles.

In FIG. 4B, the watermark image embedder generates variants of a watermark image, e.g., a first variant 420-1, a second variant 420-2, a third variant 420-3, and a fourth variant 420-4 (collectively referred to hereinafter as the variants 420) according to different parameters specifying different sizes of the watermark identifier and/or different locations of the watermark identifier. In FIG. 4C, the watermark image embedder generates variants of a watermark image, e.g., a first variant 430-1, a second variant 430-2, a third variant 430-3, and a fourth variant 430-4 (collectively referred to hereinafter as the variants 430) according to different parameters specifying different languages of the watermark identifier characters. In FIGS. 4B and 4C, at different times, e.g., time $T_1$, time $T_2$, time $T_3$, and time $T_4$, the watermark image embedder selects different variants according to various policies to blend into the video, e.g., selecting the first variant 420-1 at time $T_1$, the second variant 420-2 at time $T_2$, the third variant 420-3 at time $T_3$, and the fourth variant 420-4 at time $T_4$ as shown in FIG. 4B or selecting the first variant 430-1 at time $T_1$, the second variant 430-2 at time $T_2$, the third variant 430-3 at time $T_3$, and the fourth variant 430-4 at time $T_4$ as shown in FIG. 4C.

As such, even if the watermark images from two client devices are colluded, because variants of the watermark images are generated according to different parameters and blended with the video according to different policies, the detector can discover the client identifiers by trying the methods and/or the parameters in the predefined list (e.g., as recorded in the policies datastore 114, FIG. 1). When the length of the clip recorded for identification is sufficient, the detector can locate occurrences in the clip, where the watermark images from different colluding sources appear with different parameters, e.g., different sizes, locations, and/or languages, etc.

Figure 5A:
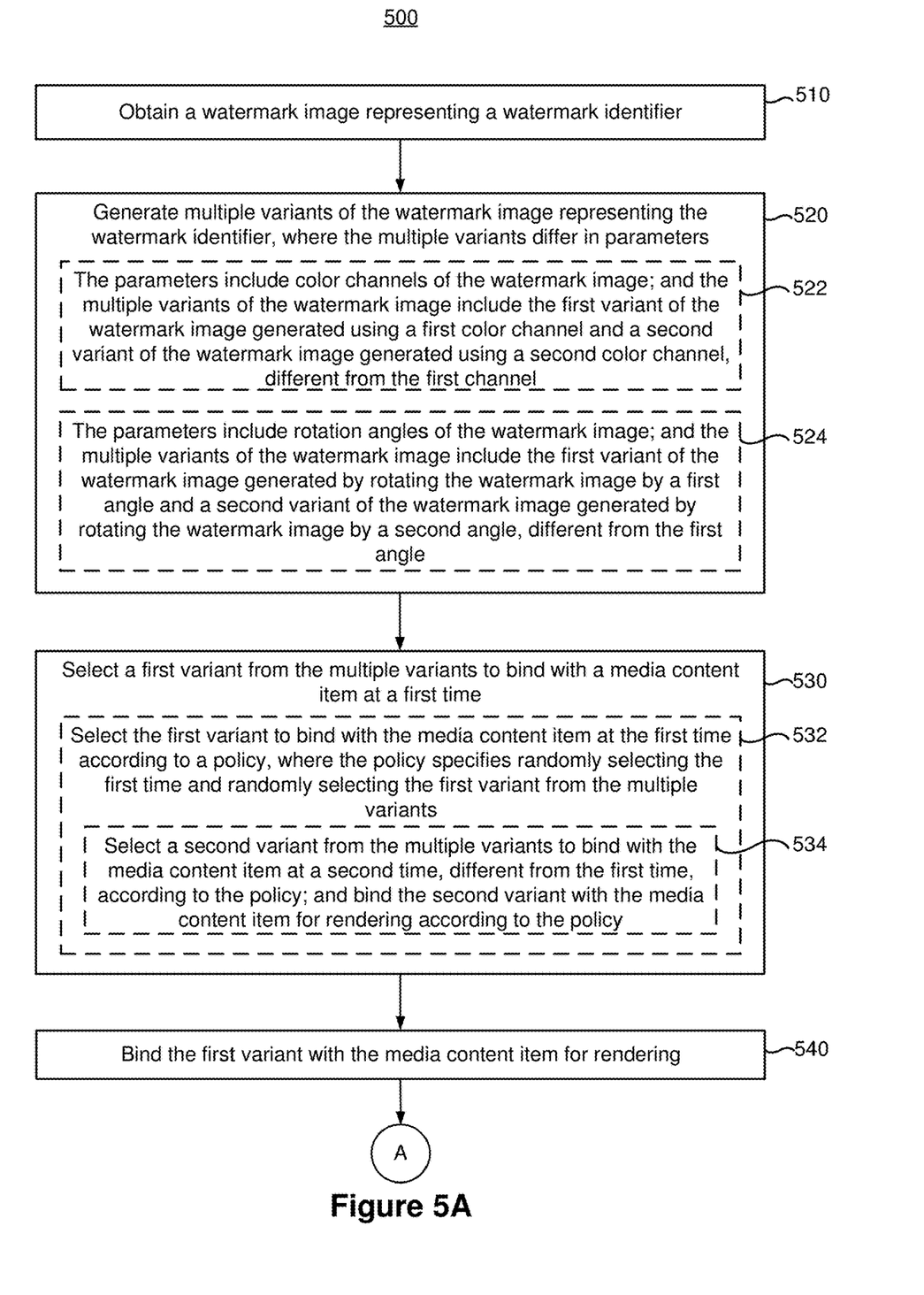
FIGS. 5A and 5B are flow diagrams illustrating an anti-collusion method that uses more than one watermark image, in accordance with some embodiments.
Figure 5B:
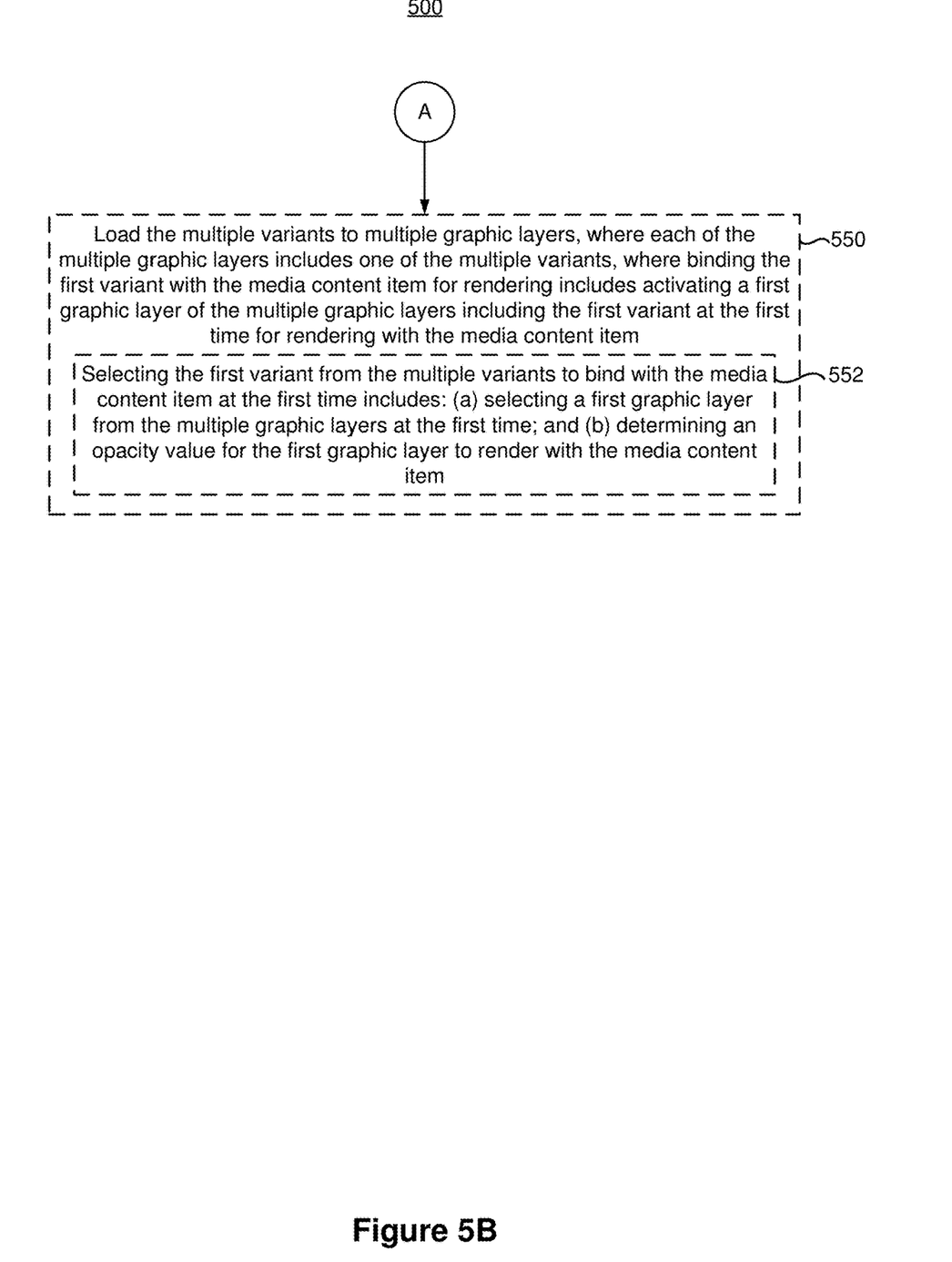

FIGS. 5A and 5B are flow diagrams illustrating a method 500 for using more than one watermark images for anti-collusion in accordance with some embodiments. In some embodiments, the method 500 is performed at a device that includes a processor and a non-transitory memory, e.g., client device 1 120-1, client device 2 120-2, or client device 3 120-3 in FIG. 1 and/or client device a 240-*a* or client device b 240-*b* in FIG. 2B. In particular, the method 500 is performed at the client device by the watermark image embedder, e.g., watermark image embedder 1 122-1, watermark image embedder 2 122-2, or watermark image embedder 3 120-3 in FIG. 1 and/or watermark image embedder a 122-*a* or watermark image embedder b 122-*b* in FIG. 2B.

As represented by block 510, the method 500 begins with the watermark image embedder obtaining a watermark image representing a watermark identifier. The method 500 continues, as represented by block 520, with the watermark image embedder generating multiple variants of the watermark image representing the watermark identifier, where the multiple variants differ in parameters. In some embodiments, as represented by block 522, the parameters include color channels of the watermark image, and the multiple variants of the watermark image include the first variant of the watermark image generated using a first color channel and a second variant of the watermark image generated using a second color channel, different from the first channel. For example, in FIG. 2B, watermark image embedder a 122-*a* obtains a watermark image with a numerical watermark ID, 111101, and uses channel U or channel V to generate variants of the watermark image. Also as shown in FIG. 2B, watermark image embedder b 122-*b* obtains a watermark image with a numerical watermark ID, 100101, and uses channel U or channel V to generate variants of the watermark image. As such, the watermark image embedder generates the same watermark image representing the client ID using different color channels, e.g., channels U and V.

In some embodiments, as represented by block 524, the parameters include rotation angles of the watermark image, and the multiple variants of the watermark image include the first variant of the watermark image generated by rotating the watermark image by a first angle and a second variant of the watermark image generated by rotating the watermark image by a second angle, different from the first angle. For example, in FIG. 4A, the watermark image embedder generates an image with the watermark ID and generates variants 410-1, 410-2, 410-3, and 410-4 by rotating the watermark image according to different rotation angles.

The method 500 continues, as represented by block 530, with the watermark image embedder selecting a first variant from the multiple variants to bind with a media content item at a first time. For example, in FIG. 2B, according to policy a, watermark image embedder a 122-*a* selects the variant generated using channel U to bind with the media content at time $T_1$ and time $T_2$ and selects the variant generated using channel V to bind with the media content at time $T_3$ and time $T_4$. Also as shown in FIG. 2B, according to policy b, watermark image embedder b 122-*b* selects the variant generated using channel V to bind with the media content at time $T_1$ and selects the variant generated using channel U to bind with the media content at time $T_2$, time $T_3$, and time $T_4$. In FIG. 3, the watermark embedder selects a variant layer WMa to bind with the media content item at time $T_1$ and $T_3$ and selects another variant layer WMb to bind with the media content item at time $T_2$ and $T_4$. In FIG. 4B, the watermark image embedder selects variants 420-1, 420-2, 420-3, and 420-4 to bind with the media content item at time $T_1$, $T_2$, $T_3$, and $T_4$, respectively. Likewise, in FIG. 4C, the watermark image embedder selects variants 430-1, 430-2, 430-3, and 430-4 to bind with the media content item at time $T_1$, $T_2$, $T_3$, and $T_4$, respectively.

In some embodiments, as represented by block 532, selecting the first variant from the multiple variants to bind with a media content item at the first time includes selecting the first variant to bind with the media content item at the first time according to a policy, where the policy specifies randomly selecting the first time and randomly selecting the first variant from the multiple variants. In such embodiments, as represented by block 534, the method 500 further includes selecting a second variant from the multiple variants to bind with the media content item at a second time, different from the first time, according to the policy, and binding the second variant with the media content item for rendering according to the policy in accordance with some embodiments. For example, in FIGS. 2B, 3, and 4A-4C, according to various policies, the watermark image embedder can randomly select from a predefined list of variants to apply according to various time intervals. As shown in FIG. 2B, randomizing the watermarking image selection with randomized time intervals between selections ensures that there are times when the source images use different methods and/or parameters, thus allowing the identification of colluding sources.

The method 500 continues, as represented by block 540, with the watermark image embedder binding the first variant with the media content item for rendering. For example, in FIG. 1, watermark image embedder 2 122-2 selects the variant in WM2*b* layer to bind with the video and the EPG for rendering. In another example, also shown in FIG. 1, watermark image embedder 3 122-3 selects variant j to be in WM3 layer to bind with the video for rendering.

Turning to FIG. 5B, as represented by block 550, in some embodiments, the method 500 includes loading the multiple variants to multiple graphic layers, where each of the multiple graphic layers includes one of the multiple variants, and where embedding the first variant in the media content item for rendering includes activating a first graphic layer of the multiple graphic layers including the first variant at the first time for rendering with the media content item. In such embodiments, as represented by block 552, selecting the first variant from the multiple variants to bind with the media content item at the first time includes: (a) selecting a first graphic layer from the multiple graphic layers at the first time; and (b) determining an opacity value for the first graphic layer to render with the media content item. For example, in FIG. 3, the watermark image embedder creates more than one watermark image, e.g., WMa and WMb. In FIG. 1, watermark image embedder 2 122-2 loads each image to a separate graphic layer, pane, and/or surface. Further, as shown in FIGS. 1 and 3, the watermark image embedder activates a single layer at a time according to various policies. Additionally as shown in FIG. 3, the watermark image embedder selects different opacity values at time $T_1$, $T_2$, $T_3$, and $T_4$, respectively. Additionally as shown in FIG. 3, the watermark image embedder determines which layer to show and with what opacity and/or transparency according to various policies.

Figure 6:
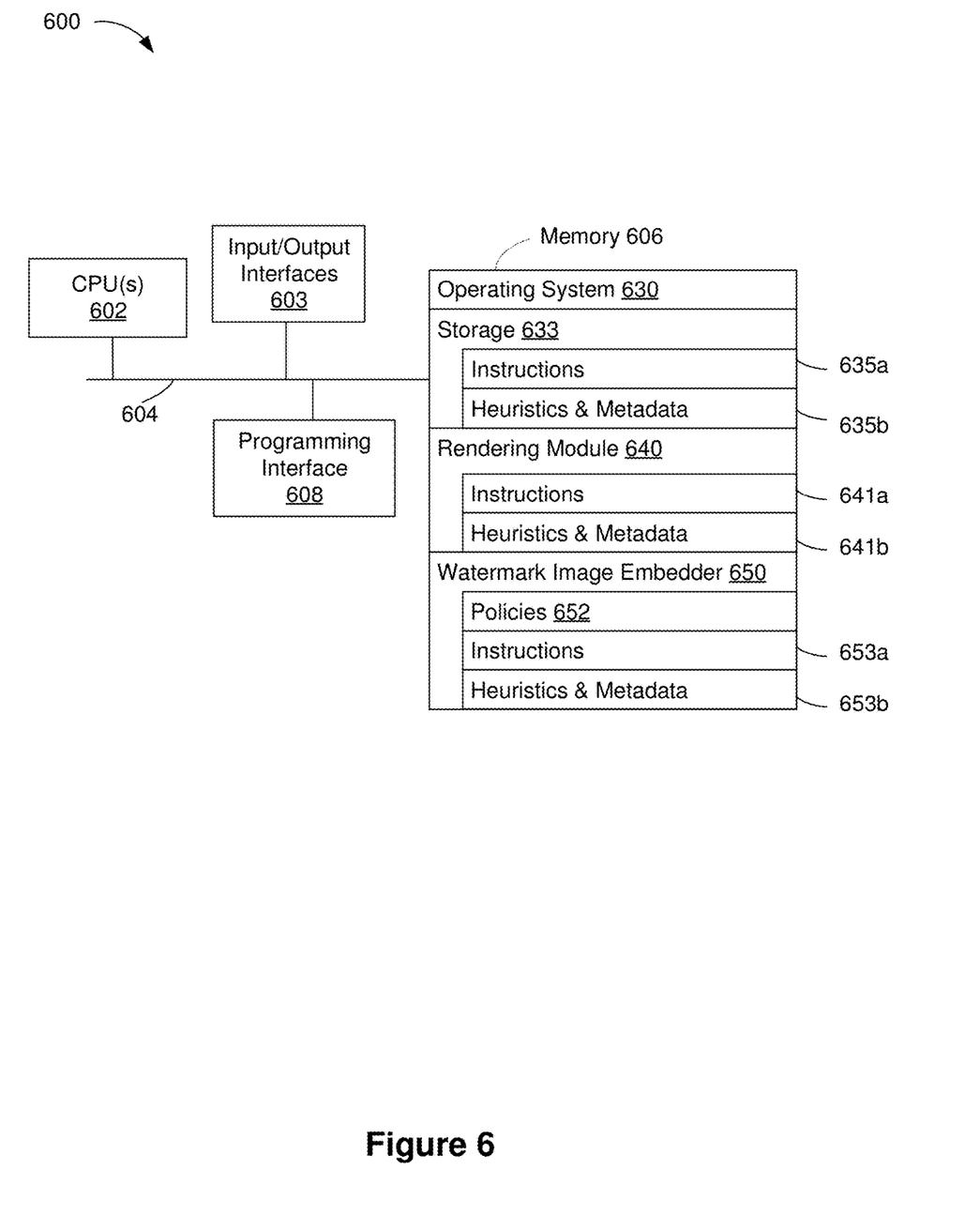
FIG. 6 is a block diagram of a computing device for anti-collusion, in accordance with some embodiments.

FIG. 6 is a block diagram of a computing device 600 for anti-collusion in accordance with some embodiments. In some embodiments, the computing device 600 performs one or more functions of client device 1 120-1, client device 2 120-2, or client device 3 120-3 in FIG. 1 and/or client device a 240-a or client device b 240-b in FIG. 2B and performs one or more of the functionalities described above with respect to the client device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPUs) 602 (e.g., processors), one or more input/output interfaces 603 (e.g., input devices, sensors, a network interface, a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 633, a rendering module 640, and a watermark image embedder 650. In some embodiments, one or more instructions are included in a combination of logic and non-transitory memory. The operating system 630 includes procedures for handling various basic system services and for performing hardware dependent tasks.

In some embodiments, the storage module 633 stores the variants generated by the watermark image embedder 650. To that end, the storage module 633 includes a set of instructions 635a and heuristics and metadata 635b.

In some embodiments, the rendering module 640 is configured to render multimedia content (e.g., videos, audio, text, etc.) along with the watermark image provided by the watermark image embedder 650. To that end, the rendering module 640 includes a set of instructions 641a and heuristics and metadata 641b.

In some embodiments, the watermark image embedder 650 (e.g., watermark image embedder 1 122-1, watermark image embedder 2 122-2, or watermark image embedder 3 122-3 in FIG. 1 or watermark image embedder a 122-a or watermark image embedder b 122-b in FIG. 2B) includes policies 652 (e.g., a subset of the policies datastore 114 in FIGS. 1 and 2B). In some embodiments, the watermark image embedder 650 is configured to create watermark image(s), generate variants of a watermark image, and/or select a watermark image for binding with the media content item according to policies 652. To that end, the watermark image embedder 650 includes a set of instructions 653a and heuristics and metadata 653b.

Although the storage module 633, the rendering module 640, and the watermark image embedder 650 are illustrated as residing on a single computing device 600, it should be understood that in other embodiments, any combination of the storage module 633, the rendering module 640, and the watermark image embedder 650 can reside in separate computing devices in various embodiments. For example, in some embodiments, each of the storage module 633, the rendering module 640, and the watermark image embedder 650 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a device including a processor and a non-transitory memory:
   obtaining a watermark image representing a watermark identifier represented by a watermark image, distinct from a media content item;
   generating multiple variants of the watermark image representing the watermark identifier, wherein the multiple variants representing the watermark identifier differ in rendering parameters;
   selecting a first variant from the multiple variants to bind with the media content item at a first time; and
   embedding the watermark identifier in the media content item by binding the first variant with the media content item for rendering.

2. The method of claim 1, wherein:
   the rendering parameters include color channels of the watermark image; and
   the multiple variants of the watermark image include the first variant of the watermark image generated using a first color channel and a second variant of the watermark image generated using a second color channel, different from the first channel.

3. The method of claim 1, wherein:
   the rendering parameters include rotation angles of the watermark image; and
   the multiple variants of the watermark image include the first variant of the watermark image generated by rotating the watermark image by a first angle and a second variant of the watermark image generated by rotating the watermark image by a second angle, different from the first angle.

4. The method of claim 1, wherein selecting the first variant from the multiple variants to bind with the media content item at the first time includes selecting the first variant to bind with the media content item at the first time according to a policy, wherein the policy specifies randomly selecting the first time and randomly selecting the first variant from the multiple variants.

5. The method of claim 4, further comprising:
   selecting a second variant from the multiple variants to bind with the media content item at a second time, different from the first time, according to the policy; and
   binding the second variant with the media content item for rendering according to the policy.

6. The method of claim 1, further comprising:
   loading the multiple variants to multiple graphic layers, wherein each of the multiple graphic layers includes one of the multiple variants, wherein:
   binding the first variant with the media content item for rendering includes activating a first graphic layer of the multiple graphic layers including the first variant at the first time for rendering with the media content item.

7. The method of claim 6, wherein selecting the first variant from the multiple variants to bind with the media content item at the first time includes:
   selecting a first graphic layer from the multiple graphic layers at the first time; and
   determining an opacity value for the first graphic layer to render with the media content item.

8. A device comprising:
   a processor;
   a non-transitory memory; and
   one or more programs stored in the non-transitory memory, which, when executed by the one or more processors, cause the device to:
   obtain a watermark image representing a watermark identifier represented by a watermark image, distinct from a media content item;
   generate multiple variants of the watermark image representing the watermark identifier, wherein the multiple variants representing the watermark identifier differ in rendering parameters;
   select a first variant from the multiple variants to bind with the media content item at a first time; and
   embed the watermark identifier in the media content item by binding the first variant with the media content item for rendering.

9. The device of claim 8, wherein:
   the rendering parameters include color channels of the watermark image; and
   the multiple variants of the watermark image include the first variant of the watermark image generated using a first color channel and a second variant of the watermark image generated using a second color channel, different from the first channel.

10. The device of claim 8, wherein:
    the rendering parameters include rotation angles of the watermark image; and
    the multiple variants of the watermark image include the first variant of the watermark image generated by rotating the watermark image by a first angle and a second variant of the watermark image generated by rotating the watermark image by a second angle, different from the first angle.

11. The device of claim 8, wherein selecting the first variant from the multiple variants to bind with the media content item at the first time includes selecting the first variant to bind with the media content item at the first time according to a policy, wherein the policy specifies randomly selecting the first time and randomly selecting the first variant from the multiple variants.

12. The device of claim 11, wherein the one or more programs, which, when executed by the one or more processors, further cause the device to:
    select a second variant from the multiple variants to bind with the media content item at a second time, different from the first time, according to the policy; and
    bind the second variant with the media content item for rendering according to the policy.

13. The device of claim 8, wherein the one or more programs, which, when executed by the one or more processors, further cause the device to:
- load the multiple variants to multiple graphic layers, wherein each of the multiple graphic layers includes one of the multiple variants, wherein:
- binding the first variant with the media content item for rendering includes activating a first graphic layer of the multiple graphic layers including the first variant at the first time for rendering with the media content item.

14. The device of claim 13, wherein selecting the first variant from the multiple variants to bind with the media content item at the first time includes:
- selecting a first graphic layer from the multiple graphic layers at the first time; and
- determining an opacity value for the first graphic layer to render with the media content item.

15. A non-transitory memory storing one or more programs, which, when executed by one or more processors of a device, cause the device to:
- obtain a watermark image representing a watermark identifier represented by a watermark image, distinct from a media content item;
- generate multiple variants of the watermark image representing the watermark identifier, wherein the multiple variants representing the watermark identifier differ in rendering parameters;
- select a first variant from the multiple variants to bind with the media content item at a first time; and
- embed the watermark identifier in the media content item by binding the first variant with the media content item for rendering.

16. The non-transitory memory of claim 15, wherein:
- the rendering parameters include color channels of the watermark image; and
- the multiple variants of the watermark image include the first variant of the watermark image generated using a first color channel and a second variant of the watermark image generated using a second color channel, different from the first channel.

17. The non-transitory memory of claim 15, wherein:
- the rendering parameters include rotation angles of the watermark image; and
- the multiple variants of the watermark image include the first variant of the watermark image generated by rotating the watermark image by a first angle and a second variant of the watermark image generated by rotating the watermark image by a second angle, different from the first angle.

18. The non-transitory memory of claim 15, wherein selecting the first variant from the multiple variants to bind with the media content item at the first time includes selecting the first variant to bind with the media content item at the first time according to a policy, wherein the policy specifies randomly selecting the first time and randomly selecting the first variant from the multiple variants.

19. The non-transitory memory of claim 15, wherein the one or more programs, which, when executed by the one or more processors, further cause the device to:
- load the multiple variants to multiple graphic layers, wherein each of the multiple graphic layers includes one of the multiple variants, wherein:
- binding the first variant with the media content item for rendering includes activating a first graphic layer of the multiple graphic layers including the first variant at the first time for rendering with the media content item.

20. The non-transitory memory of claim 19, wherein selecting the first variant from the multiple variants to bind with the media content item at the first time includes:
- selecting a first graphic layer from the multiple graphic layers at the first time; and
- determining an opacity value for the first graphic layer to render with the media content item.

* * * * *